(12) United States Patent
Steinrisser

(10) Patent No.: US 7,874,760 B2
(45) Date of Patent: Jan. 25, 2011

(54) TOOTH PROFILE OF A SPLINE SHAFT

(75) Inventor: Niculo Steinrisser, Maennedorf (CH)

(73) Assignee: Ernst Grob AG, Maennedorf (CH)

( * ) Notice: Subject to any disclaimer, the term of this patent is extended or adjusted under 35 U.S.C. 154(b) by 375 days.

(21) Appl. No.: 10/598,011

(22) PCT Filed: Feb. 19, 2004

(86) PCT No.: PCT/CH2004/000089

§ 371 (c)(1),
(2), (4) Date: Aug. 15, 2006

(87) PCT Pub. No.: WO2005/080815

PCT Pub. Date: Sep. 1, 2005

(65) Prior Publication Data

US 2007/0183844 A1     Aug. 9, 2007

(51) Int. Cl.
B25G 3/28      (2006.01)
(52) U.S. Cl. .............. 403/359.1; 403/359.5; 403/359.6; 464/162; 464/182; 29/557
(58) Field of Classification Search .............. 403/359.1, 403/359.5, 359.6; 464/162, 182; 29/557
See application file for complete search history.

(56) References Cited

U.S. PATENT DOCUMENTS

| 1,586,990 | A | * | 6/1926 | Harrison ..................... 464/179 |
|---|---|---|---|---|
| 3,364,768 | A | * | 1/1968 | Powell ......................... 74/339 |
| 3,367,142 | A | * | 2/1968 | Grove et al. ................. 464/162 |
| 3,424,695 | A | * | 1/1969 | Von Wiesenthal .......... 48/127.9 |
| 3,813,899 | A | * | 6/1974 | Abrahamer ................... 464/16 |
| 4,622,022 | A | * | 11/1986 | Diffenderfer et al. ....... 464/162 |
| 4,667,530 | A | * | 5/1987 | Mettler et al. ................. 74/493 |
| 5,180,043 | A |   | 1/1993 | Walker |
| 5,243,874 | A |   | 9/1993 | Wolfe et al. |
| 5,645,366 | A | * | 7/1997 | Ishibashi et al. ......... 403/359.5 |
| 5,647,683 | A | * | 7/1997 | Easley ..................... 403/359.6 |
| 5,720,102 | A |   | 2/1998 | McClanahan |
| 6,183,230 | B1 | * | 2/2001 | Beardmore et al. ......... 418/171 |
| 6,193,612 | B1 | * | 2/2001 | Craig et al. ................. 464/162 |
| 6,705,949 | B2 | * | 3/2004 | Glowacki et al. ........... 464/183 |
| 6,726,228 | B2 | * | 4/2004 | Crawford ................. 280/86.75 |
| 6,997,076 | B2 | * | 2/2006 | Menjak et al. ................ 74/409 |
| 7,048,972 | B2 | * | 5/2006 | Kitahata et al. ............. 427/466 |
| 2002/0040835 | A1 |   | 4/2002 | Fukukawa et al. |

* cited by examiner

Primary Examiner—Daniel P Stodola
Assistant Examiner—Nahid Amiri
(74) Attorney, Agent, or Firm—Greenblum & Bernstein, P.L.C.

(57) ABSTRACT

A groove profile for a positive hub-shaft connection has a hub having a plurality of grooves with an essentially quadrilateral groove cross section and a shaft having a plurality of grooves with an essentially quadrilateral groove cross section. Additionally, the groove profile has at least one rib radially projecting from one of the grooves of the hub or shaft towards one of the grooves of the other of the hub or shaft.

24 Claims, 3 Drawing Sheets

TOOTH PROFILE OF A SPLINE SHAFT

CROSS-REFERENCE TO RELATED APPLICATIONS

The present application is a U.S. National Stage Application of International Application No. PCT/CH2004/000089 filed Feb. 19, 2004, which published as WO 2005/080815 A1 on Sep. 1, 2005, the disclosure of which is expressly incorporated by reference herein in its entirety.

BACKGROUND OF THE INVENTION

1. Field of the Invention

The present invention relates to a tooth profile for a positive hub-shaft connection with an essentially rectangular or trapezoidal groove cross section.

2. Background Description

Parallel key or sliding feather key connections are often used for the positive connection of a hub with a shaft. If large torques are to be transmitted and a displacement is to be rendered possible between hub and shaft, a multiple-groove profile or a spline shaft is often used.

The grooves thereby often have either a rectangular or a trapezoidal profile. The profiles are thereby produced either by machining or by cold forming, such as, e.g., by impact roll methods. Compared to machining, cold forming has above all the advantage of greater cost-effectiveness with large quantities to be produced.

Particularly with cold forming, in the production of such profiles a number of parameters are of crucial importance for the precision of the profile. These are in particular the diameter, the tooth thickness, the pitch, the groove flank or tooth flank shape and direction, the ovality of the workpiece, etc. The fits of these individual parameters ultimately accumulate into fit errors between hub and shaft, which are significant for an effective connection between hub and shaft. These fits are therefore to be designed with sufficient play in order to make a connection possible at all. However, this necessary play now leads to a reduction in the quality of the mating between hub and shaft, which has a negative impact, depending on the parameters and application purpose of the connection. In the subsequent cold forming, the quality requirements for these workpieces can often be met only to a qualified extent due to the inhomogeneities of the raw material.

These problems can occur with clutch disk carriers for automatic transmissions for vehicles or, e.g., markedly in the production of drive-shaft telescopic tubes, which are used in large numbers, e.g., in vehicle construction. Respectively one inner tube and one outer tube with corresponding profiling on the inside or outside are used. Due to the large production runs, the cold working method is very important for an economic production, but very high demands are made on the precision of the profile connection between inner and outer tube due to the high rotational speed of drive-shaft telescopic tubes during operation.

In the use of conventional profiles, a buckling play develops between the two tubes, caused by the usually large profile length, which in operation can lead to unacceptable radial movements of the drive shaft, which can go as far as the destruction of the drive shaft at high loads and rotational speeds. The buckling play is caused by the radial play between the profile of the inner and outer tube.

SUMMARY OF THE INVENTION

The aim of the present invention was to find a tooth profile for drive components, in particular for drive shafts embodied in a displaceable manner with respect to one another, with which the radial play is minimized or even eliminated.

This aim is attained according to the invention through a tooth profile for a positive hub-shaft connection with an essentially rectangular or trapezoidal groove cross section, characterized in that the groove root or the groove head either of the hub or of the shaft has at least one rib projecting radially outwards. Further preferred embodiments according to the invention will be apparent from the features of further dependent claims.

The groove profile according to the invention for a positive hub-shaft connection with an essentially rectangular or trapezoidal groove cross section has at least one rib projecting radially outwards on the groove root or on the groove head either of the hub or of the shaft. A linear-areal support is thus formed in the radial direction with respect to the longitudinal axis of the hub or of the shaft. Such a support can be embodied advantageously with little play or completely free from play.

Preferably each groove root or each groove head of the hub or of the shaft has at least one rib. A defined connection of the profiles between hub and shaft is thus obtained along the entire circumference and an exact radial positioning of the shaft in the hub is achieved.

The rib is preferably embodied running parallel to the flank of the groove, preferably along the entire length of the corresponding groove root or groove head. Particularly with large tooth lengths, such as occur in telescopic tubes, a precise radial linear-areal connection is thus achieved between the grooves of the hub and the shaft, or of the inner and outer tube.

The rib preferably has a trapezoidal cross section tapering outwards. This type of shape is easy to produce by cold forming and has a high dimensional stability. The rib preferably has a maximum width of 50%, preferably 25%, of the width of the corresponding groove root or groove head. The narrower the rib is embodied, the smaller the support surface of the rib head becomes on the corresponding surface of the opposite groove root or groove head. Precise geometric conditions can thus also be achieved over larger profile lengths.

The radius of the support surface of the rib to the opposite groove root or head is preferably embodied free from play or with initial stress with respect to the longitudinal axis of the hub or the shaft. The radial play between the hub and the shaft can thus be virtually completely neutralized. Furthermore, it has been shown that even an initial stress can be built up, i.e., the radius of the support surface of the rib is larger than the radius of the groove root or groove head opposite if the ribs are embodied on the hub profile. This is suitable in particular with thin-walled hollow profiles, whereby either the hub or the shaft or both parts are embodied as hollow profiles. Furthermore, ovality of the cross section, also caused by inhomogeneities of the material and occurring particularly with hollow profiles, can thus advantageously be corrected.

At least two ribs arranged parallel to one another are preferably respectively embodied in one groove root or groove head. It can be advantageous to provide more than one rib according to the dimensions of the profiles and the dimensions of hub and shaft and the forces and rotational speeds to be transmitted.

The pockets formed next to the rib or ribs and between the surfaces of the profile roots or profile heads lying radially opposite have furthermore proven very advantageous for the distribution of lubricant in the interspace of the profiles.

The aim is further attained through a telescopic tube for drive shafts with an inner tube and an outer tube, in which the inner tube or the outer tube has a groove profile for a positive hub-shaft connection with an essentially rectangular or trapezoidal groove cross section, characterized in that the groove root or the groove head either of the inner tube or of the outer tube has at least one rib projecting radially outwards.

The inner tube and the outer tube are thereby preferably embodied as hollow bodies with approximately uniform profile thickness. Drive shafts of this type are particularly suitable for use in motor vehicles for power transmission from the engine to the drive axles or drive wheels.

Furthermore according to the invention a method is proposed for producing a groove profile for a positive hub-shaft connection with an essentially rectangular or trapezoidal groove cross section, characterized in that the groove root or the groove head either of the hub or of the shaft has at least one rib projecting radially outwards by the cold-rolling method, in which one or more profile rolls or profile rollers are brought into engagement with the surface of the hub or shaft in conformity with the profile mandrel necessary for profiling and located within the hollow member and having a profile embodied in accordance with the rib. The rib can thus be advantageously produced in one operation together with the embodiment of the grooves.

The profile rolls or profile rollers are preferably brought into periodic impacting engagement. Particularly precise profiles can be produced through this impact roll process.

BRIEF DESCRIPTION OF THE DRAWINGS

An exemplary embodiment of the present invention is explained in more detail below on the basis of drawings. They show.

DETAILED DESCRIPTION OF THE INVENTION

Figure 1:
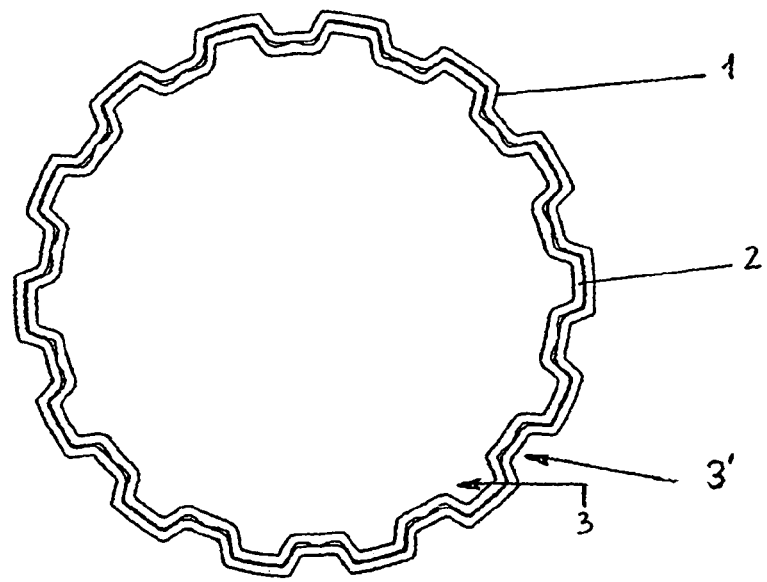
FIG. 1 The cross section through a telescopic tube with groove profile according to the invention.

FIG. 1 shows the cross section through the outer tube 1 and inner tube 2 of a telescopic tube, such as is used, e.g., in vehicle construction, which inner tube and outer tube are embodied as a hollow profile. Both the outer tube 1 and the inner tube 2 thereby have a profiling arranged uniformly along the circumference and have groove 3' and groove 3, respectively, with trapezoidal cross section.

Figure 2:
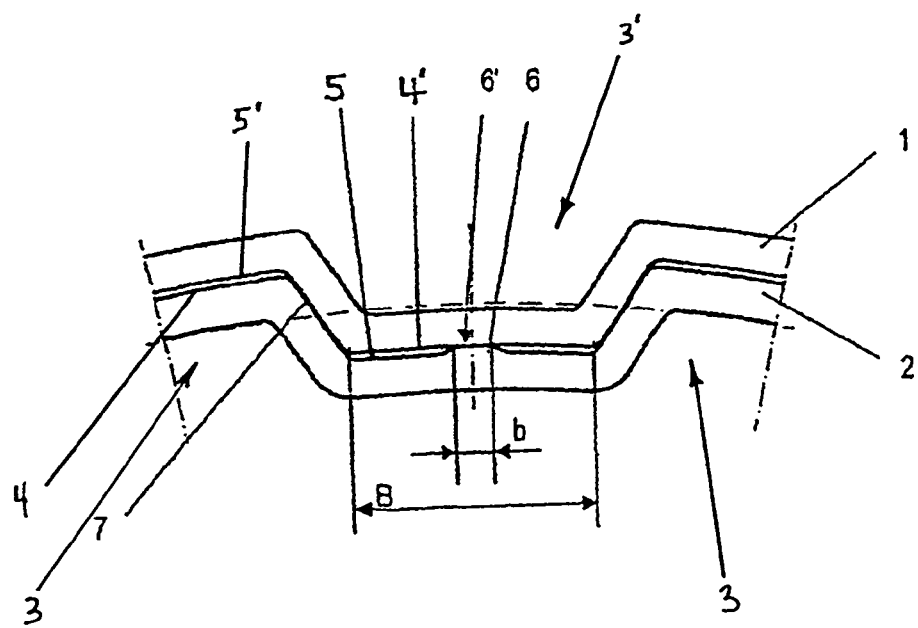
FIG. 2 The cross section through a section of a groove from FIG. 1 embodied according to the invention.

FIG. 2 shows in more detail the section of a single groove profile 3' of the telescopic tube according to FIG. 1. Additionally, FIG. 2 shows two portions of adjacent grooves 3 of the inner tube. The outer tube 1 thereby has a groove 3' embodied inwardly, i.e., concave upward, and trapezoidal in shape with a groove head 4' directed towards the inside and a groove root 5', adjacent each side of the groove head 4', directed towards the inside. The groove head 4' has a cylindrical surface with respect to the longitudinal axis of the telescopic tube. The inner tube has a groove 3 embodied outwardly, i.e., concave downwardly, accordingly with a groove head 4 directed towards the outside and a groove root 5, adjacent each side of the groove head 4, directed towards the outside. The groove root 5 likewise has a cylindrical surface analogous to the groove head 4'.

A rib 6 projecting radially outwards is now embodied in the groove root 5. In this example the front face 6' of the rib 6 rests in the center of the groove head 4' of the outer tube advantageously without play. Practically a point-to-surface or, with regard to the longitudinal extension of the grooves 3 and 3', a line-to-surface connection is created through the small support width b compared to the groove width B of the groove head 4'. Furthermore, the small width b of the rib 6 permits a precise production while maintaining the lowest tolerances even with cold forming, which allows the mating to be designed free from play in the first place.

The flanks 7 facing one another of the grooves 3' of the outer tube 1 and the grooves 3 of the inner tube 2 respectively advantageously have a little play with respect to one another in order to compensate for inaccuracies of the flank angle and the pitch of the grooves during the production of the groove profile and to render possible a mating of outer tube 1 and inner tube 2. The play can be, e.g., approx. 0.05 mm with an average tube diameter of 100 mm and a wall thickness of 2 mm. Such values can be achieved with cold forming methods.

If each groove root 5 of each groove 3 of the inner tube 2 now advantageously has a rib 6 of this type, the radial play of the connection between outer tube 1 and inner tube 2 can thus be advantageously completely neutralized. The buckling play harmful with such telescopic tubes is thus also reliably neutralized.

Figure 3:
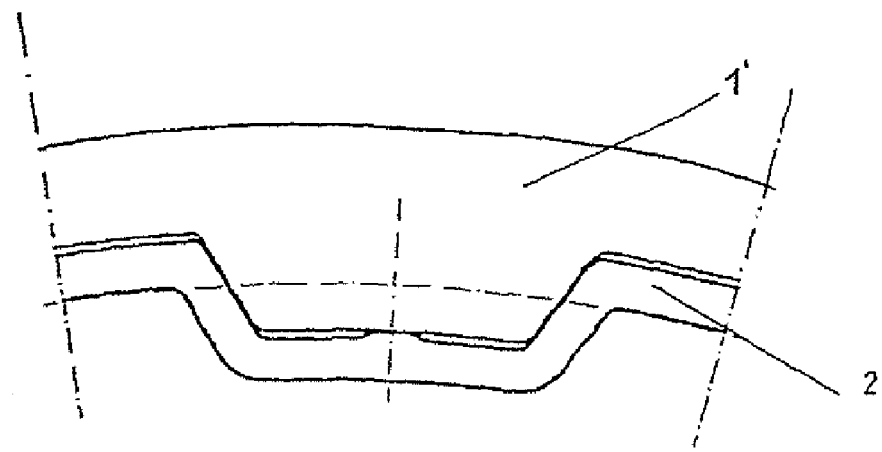
FIG. 3 The cross section of a section of an alternative embodiment variant of a telescopic tube.
Figure 4:
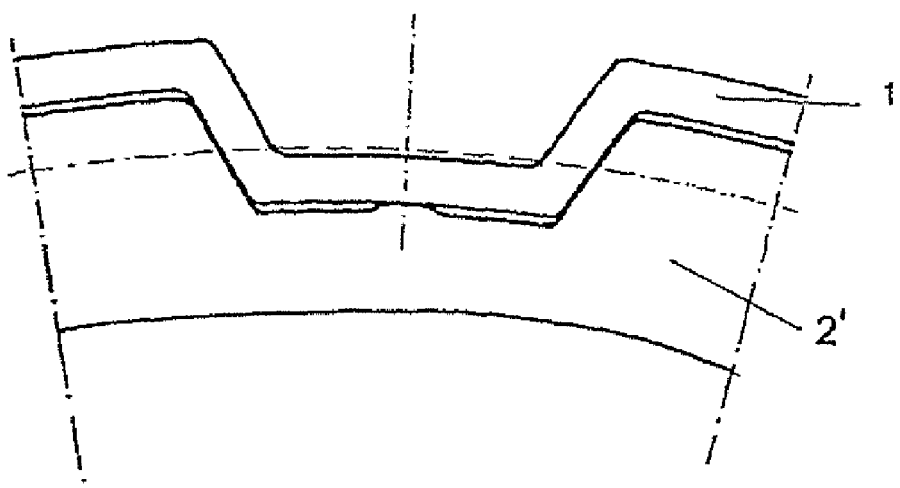
FIG. 4 The cross section of a section of another alternative embodiment variant of a telescopic tube.

FIGS. 3 and 4 show further exemplary embodiments of the groove profile according to the invention with rib 6 on thick-walled tube profiles 1' or 2'. It is clear that a combination of two thick-walled tube profiles 1' and 2' is also conceivable, as a solid profile can also be used as inner tube 2.

Figure 5:
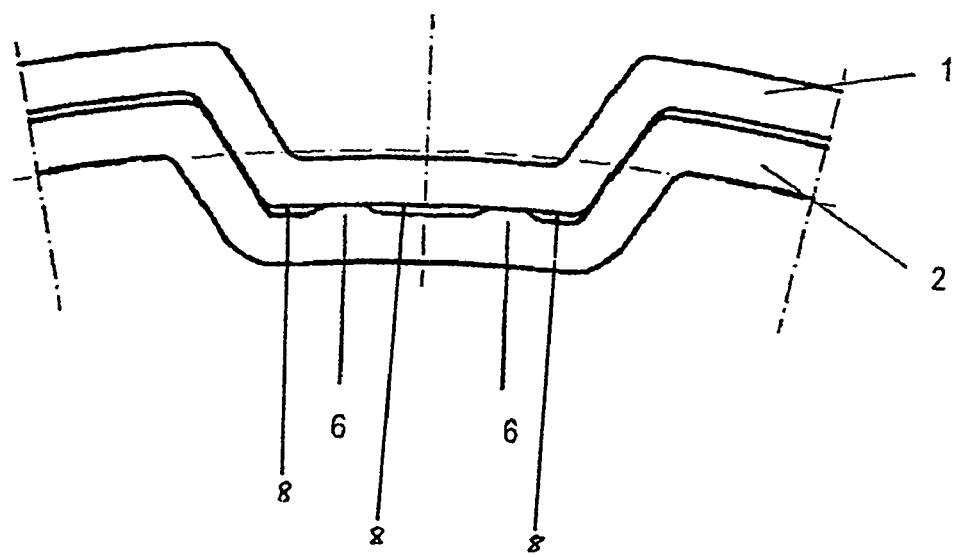
FIG. 5 The cross section through a section according to FIG. 2 with an alternative embodiment of the groove according to the invention.

FIG. 5 shows still a further alternative embodiment of the groove profile according to the invention, whereby two ribs 6 lying parallel to one another are here embodied in the groove root 5. Incidentally, it has been shown that the pockets 8 embodied between the ribs 6 and the groove root 5 or groove head 4 are optimally suitable for the accommodation and distribution of lubricants and have better lubricant properties compared to conventional groove profiles without ribs 6.

It is self-evident to one skilled in the art that the ribs 6 can also be embodied, e.g., on the inside of the outer tube 1 on the groove head 4' and consequently point inwards. The ribs 6 can also be respectively arranged on the groove head 4 of the inner tube 2 or the groove root 5' of the outer tube 1.

Since the ribs 6 can be produced in exact dimensions, instead of neutralizing the play between the front faces 6' of the rib 6 and the groove head 4 lying opposite, an initial stress can be set in that the front face 6' has a larger radius with respect to the longitudinal axis of the outer tube 1 or of the inner tube 2 than the radius of the groove head 4. This is very particularly suitable for use with thin-walled outer tubes 1 or inner tubes 2, whereby possible ovalities, i.e., deviations from the exact circular form, can thus also be offset there.

The invention claimed is:

1. A groove profile for a positive hub-shaft connection comprising:

a hub having a plurality of grooves with an essentially quadrilateral groove cross section;

a shaft having a plurality of grooves with an essentially quadrilateral groove cross section;

at least one rib radially projecting and unitarily formed from one of the grooves of the hub or shaft towards one of the grooves of the other of the hub or shaft;

a radially inward surface of each groove of the hub forms a hub groove head and a radially outward surface of each groove of the hub forms a hub groove root; and a radially inward surface of each groove of the shaft forms a shaft groove root and a radially outward surface of each groove of the shaft forms a shaft groove head, wherein the at least one rib projects radially from one of the hub groove head, the hub groove root, the shaft groove head, and the shaft groove root, wherein the hub groove roots and the hub groove heads of the plurality of grooves of the hub and the shaft groove roots and the shaft groove heads of the plurality of grooves of the shaft are each substantially flat, and wherein each one of the hub and the shaft is a thin-walled hollow profile which is internally and externally splined.

2. The groove profile of claim 1, wherein the at least one rib radially extends from one of each hub groove head, each hub groove root, each shaft groove head and each shaft groove root.

3. The groove profile of claim 1, wherein the at least one rib runs parallel to a flank of the groove from which the rib projects.

4. The groove profile of claim 3, wherein the at least one rib runs along an entire length of the groove from which the rib projects.

5. The groove profile of claim 1, wherein the at least one rib has a trapezoidal cross section tapering outwards and has a maximum width of 50% of a width of a corresponding groove from which the rib projects.

6. The groove profile of claim 5, wherein the at least one rib has a trapezoidal cross section tapering outwards and has a maximum width of 25% of a width of the corresponding groove from which it projects.

7. The groove profile of claim 1, wherein at least two parallel ribs radially extend from one of each hub groove head, each hub groove root, each shaft groove head and each shaft groove root.

8. The groove profile of claim 1, wherein the essentially quadrilateral groove cross section is an essentially rectangular groove cross section.

9. The groove profile of claim 1, wherein the essentially quadrilateral groove cross section is an essentially trapezoidal groove cross section.

10. The groove profile of claim 1, wherein the at least one rib is formed in one piece from a material of the groove from which the at least one rib projects.

11. The groove profile of claim 1, wherein substantially flat comprises lying along one of a plurality of circles concentric with the hub and the shaft.

12. A method of producing the groove profile in accordance with claim 1, the method comprising:

conforming a surface of one of the hub and the shaft with a profile mandrel through engagement with one or more profile rollers; and profiling the surface of one of the hub and the shaft to form the at least one rib.

13. The method of claim 12, further comprising:

periodic impacting engaging of the one or more profile rollers with a surface of one of the hub and the shaft.

14. A groove profile for a positive hub-shaft connection comprising:

a hub having a plurality of grooves with an essentially quadrilateral groove cross section;

a shaft having a plurality of grooves with an essentially quadrilateral groove cross section;

at least one rib radially projecting and unitarily formed from one of the grooves of the hub or shaft towards one of the grooves of the other of the hub or shaft;

a radially inward surface of each groove of the hub forms a hub groove head and a radially outward surface of each groove of the hub forms a hub groove root; and a radially inward surface of each groove of the shaft forms a shaft groove root and a radially outward surface of each groove of the shaft forms a shaft groove head, wherein the at least one rib projects radially from one of the hub groove head, the hub groove root, the shaft groove head, and the shaft groove root, wherein the hub groove roots and the hub groove heads of the plurality of grooves of the hub and the shaft groove roots and the shaft groove heads of the plurality of grooves of the shaft are each substantially flat, wherein each one of the hub and the shaft is a thin-walled hollow profile which is internally and externally splined, and wherein a radius of a support surface of the at least one rib is such that the at least one rib imparts a connection between the hub and the shaft that is one of free from play and under initial stress with respect to a longitudinal axis of the hub or the shaft.

15. The groove profile of claim 14, wherein substantially flat comprises lying along one of a plurality of circles concentric with the hub and the shaft.

16. A telescopic tube for drive shafts, comprising:

an outer tube having a plurality of grooves with an essentially quadrilateral groove cross section;

an inner tube having a plurality of grooves with an essentially quadrilateral groove cross section;

at least one rib radially projecting and unitarily formed from one of the grooves of the outer tube or inner tube towards one of the grooves of the other of the outer tube or inner tube;

a radially inward surface of each groove of the outer tube forms an outer tube groove head and a radially outward surface of each groove of the outer tube forms an outer tube groove root; and a radially inward surface of each groove of the inner tube forms an inner tube groove root and a radially outward surface of each groove of the inner tube forms an inner tube groove head, wherein the at least one rib projects radially from one of the outer tube groove head, the outer tube groove root, the inner tube groove head, and the inner tube groove root, wherein the outer tube groove roots and the outer tube groove heads of the plurality of grooves of the outer tube and the inner tube groove roots and the inner tube groove heads of the plurality of grooves of the inner tube are each substantially flat, and wherein each one of the outer tube and the inner tube is a thin-walled hollow profile which is internally and externally splined.

17. The telescopic tube according to claim 16, wherein the inner tube and the outer tube are hollow bodies each with an approximately uniform profile thickness.

18. The telescopic tube of claim 16, wherein the essentially quadrilateral groove cross section is an essentially rectangular groove cross section.

19. The telescopic tube of claim 16, wherein the essentially quadrilateral groove cross section is an essentially trapezoidal groove cross section.

20. The telescopic tube according to claim 16, wherein the at least one rib is formed in one piece from a material of the groove from which the at least one rib projects.

21. The telescopic tube of claim 16, wherein substantially flat comprises lying along one of a plurality of circles concentric with the outer tube and the inner tube.

22. A method of producing the telescopic tube in accordance with claim 16, the method comprising:

conforming a surface of one of the outer tube and the inner tube with a profile mandrel through engagement with one or more profile rollers; and profiling the surface of one of the outer tube and the inner tube to form the at least one rib.

23. A telescopic tube for drive shafts comprising:

a outer tube having a plurality of grooves with an essentially quadrilateral groove cross section;

a inner tube having a plurality of grooves with an essentially quadrilateral groove cross section;

at least one rib radially projecting and unitarily formed from one of the grooves of the outer tube or inner tube towards one of the grooves of the other of the outer tube or inner tube;

a radially inward surface of each groove of the outer tube forms a outer tube groove head and a radially outward surface of each groove of the outer tube forms a outer tube groove root; and a radially inward surface of each groove of the inner tube a inner tube groove root and a radially outward surface of each groove of the inner tube forms a inner tube groove head, wherein the at least one rib projects radially from one of the outer tube groove head, the outer tube groove root, the inner tube groove head, and the inner tube groove root, wherein the outer tube groove roots and the outer tube groove heads of the plurality of grooves of the outer tube and the inner tube groove roots and the inner tube groove heads of the plurality of grooves of the inner tube are each substantially flat, wherein each one of the outer tube and the inner tube is a thin-walled hollow profile which is internally and externally splined, and wherein a radius of a support surface of the at least one rib to an opposite groove root or groove head is embodied such that the outer tube-inner tube connection is one of free from play and under initial stress with respect to a longitudinal axis of the outer tube or the inner tube.

24. The telescopic tube of claim 23, wherein substantially flat comprises lying along one of a plurality of circles concentric with the outer tube and the inner tube.

* * * * *

UNITED STATES PATENT AND TRADEMARK OFFICE
CERTIFICATE OF CORRECTION

| | | |
|---|---|---|
| PATENT NO. | : 7,874,760 B2 | Page 1 of 1 |
| APPLICATION NO. | : 10/598011 | |
| DATED | : January 25, 2011 | |
| INVENTOR(S) | : N. Steinrisser | |

It is certified that error appears in the above-identified patent and that said Letters Patent is hereby corrected as shown below:

On cover page (56) References Cited, U.S. Patent Documents, (Column 2, line 2), change "Grove" to --Groves--.

Signed and Sealed this
Thirtieth Day of August, 2011

David J. Kappos
*Director of the United States Patent and Trademark Office*